(12) United States Patent
Kuivamäki

(10) Patent No.: US 7,077,245 B2
(45) Date of Patent: Jul. 18, 2006

(54) TORQUE CONTROLLED BRAKE

(75) Inventor: Ismo Kuivamäki, Hyvinkää (FI)

(73) Assignee: KCI Konecranes PLC, Hyvinkaa (FI)

( * ) Notice: Subject to any disclaimer, the term of this patent is extended or adjusted under 35 U.S.C. 154(b) by 0 days.

(21) Appl. No.: 10/760,673

(22) Filed: Jan. 21, 2004

(65) Prior Publication Data

US 2004/0168865 A1    Sep. 2, 2004

(30) Foreign Application Priority Data

Jan. 22, 2003   (FI) ................................ 20030099

(51) Int. Cl.
*F16D 67/02* (2006.01)
*F16D 55/36* (2006.01)

(52) U.S. Cl. ................. 188/71.5; 188/73.1; 188/181 T; 192/12 R

(58) Field of Classification Search ...... 188/71.2–71.5, 188/71.7–71.8, 72.1, 73.1, 73.31, 195, 156–158, 188/181 T; 192/12 R, 16, 17 D; 254/316, 254/321, 322
See application file for complete search history.

(56) References Cited

U.S. PATENT DOCUMENTS

| | | | |
|---|---|---|---|
| 1,635,708 A * | 7/1927 | Cassel ........................ | 188/194 |
| 3,313,381 A * | 4/1967 | Harting et al. ............... | 188/161 |
| 3,332,525 A | 7/1967 | Eggleton et al. | |
| 3,399,867 A | 9/1968 | Schroeder | |
| 3,433,332 A | 3/1969 | Braun | |
| 3,825,100 A | 7/1974 | Freeman | |
| 4,690,379 A | 9/1987 | Nakamura ................... | 254/347 |
| 4,909,359 A * | 3/1990 | Fujinami et al. ........... | 188/71.5 |
| 5,853,165 A * | 12/1998 | Kuivamaki ................. | 254/366 |
| 6,250,438 B1 * | 6/2001 | Chern ........................ | 188/72.7 |
| 6,352,243 B1 * | 3/2002 | Samejima ................... | 254/352 |
| 6,830,141 B1 * | 12/2004 | Neelakantan et al. ...... | 192/84.6 |

FOREIGN PATENT DOCUMENTS

| | | | |
|---|---|---|---|
| FI | 20010714 A | | 4/2002 |
| JP | 10-331864 A | | 12/1998 |
| JP | 10331864 A | * | 12/1998 |

* cited by examiner

*Primary Examiner*—Melody M. Burch
(74) *Attorney, Agent, or Firm*—Birch, Stewart, Kolasch & Birch, LLP

(57) ABSTRACT

The structure and operation of a brake 1' associated with an electric motor driven chain hoist 2', according to FIG. 6, are exactly the same as those of the manually operated system, except that a shaft 4a' of the electric motor rotor 4' as well as an extension 4b' thereof form a drive shaft and the second cam part 6, the brake disc/clutch disc arrangement 9, 10, 8, a driven input shaft 7' of a hoisting apparatus 2' and the hoisting apparatus 2' itself are arranged between an electric motor 3' and the first cam part 5 on the drive shaft 4b' in such a manner that the second cam part 6 with the components 8, 9 fastened thereto may rotate therein and move axially and the input shaft 7' of the driven hoisting apparatus 2' may rotate, since the rotor 4' is placed on the opposite side of the system compared with the manually operated system shown in FIGS. 1 to 4 so that the extension 4b' of the shaft 4a' of the rotor 4' has to move through the input shaft 7'. Parts 25' and 26' of a body 13' of the brake are also shaped differently but operate similarly.

12 Claims, 4 Drawing Sheets

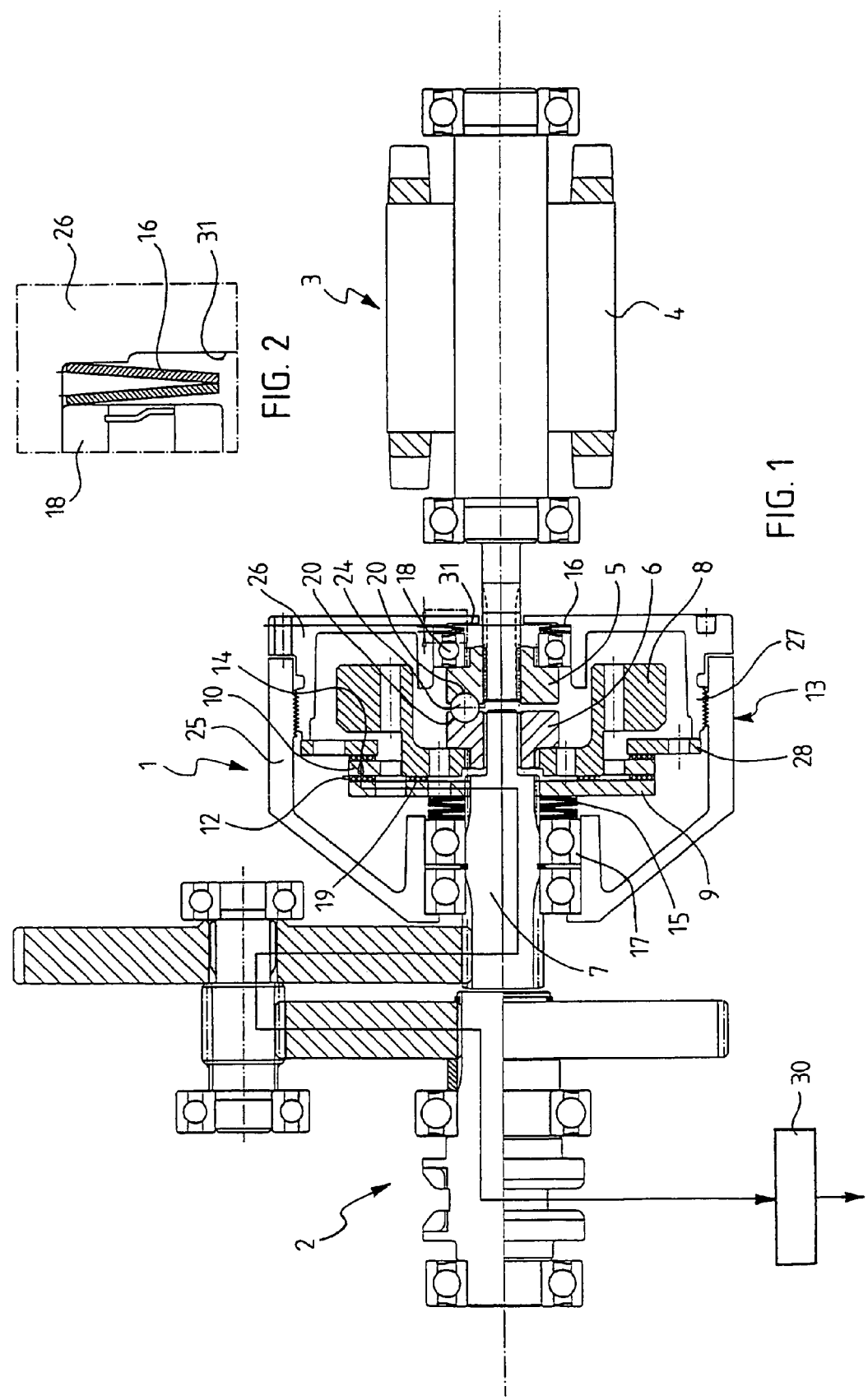

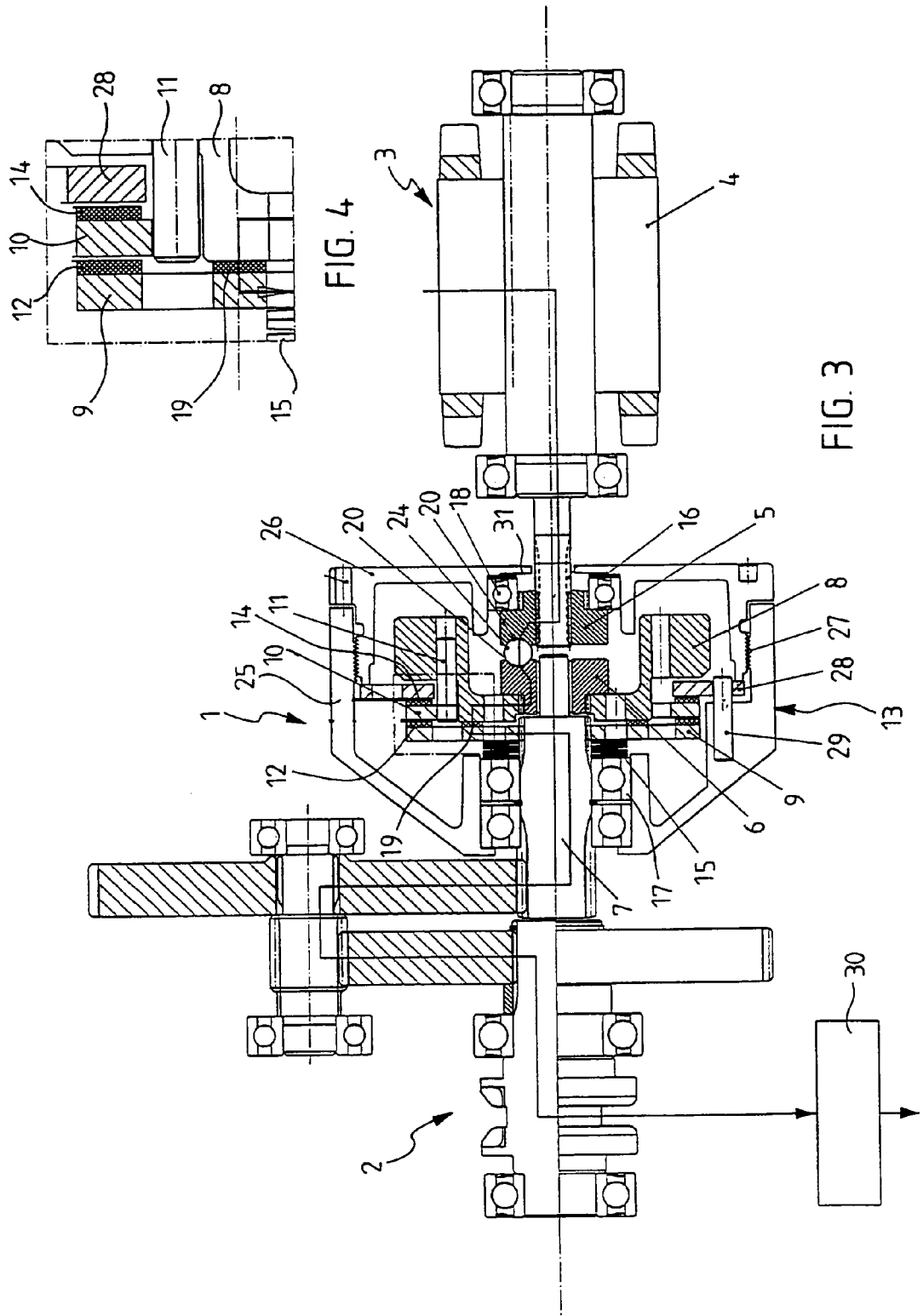

US 7,077,245 B2

TORQUE CONTROLLED BRAKE

This Nonprovisional application claims priority under 35 U.S.C. § 119(a) on Patent Application No(s). 20030099 filed in FINLAND on Jan. 22, 2003, the entire contents of which are hereby incorporated by reference.

BACKGROUND OF THE INVENTION

The invention relates to a torque controlled brake arranged between a drive shaft and a driven shaft, said brake comprising a brake disc/clutch disc arrangement arranged between the drive shaft and the driven shaft and comprising a first disc that is axially movingly but non-rotatably arranged on the driven shaft and a second disc that is axially movingly arranged between the first disc and the drive shaft, a first set of friction surface means arranged between the first disc and the second disc, a second set of friction surface means arranged between the second disc and a body of the brake, a spring arrangement arranged to axially press the discs and the friction surface means co-operating therewith against each other in order to achieve a braking engagement, and cam means arranged between the drive shaft and the brake disc/clutch disc arrangement, said means comprising a first cam part that is non-rotatably fastened to the drive shaft and a second cam part that is non-rotatably arranged on the second disc, the cam means causing by the impact of torque and rotation of the drive shaft and the possible countertorque of the driven shaft the relative axial position between the discs and the friction surface means to change in order to detach at least partly the braking engagement against the force caused by the spring arrangement.

Such a brake is disclosed in Finnish patent application 20010714. Here, a particular aim has been to better control the loads from the direction of the load in order to avoid safety risks. What has also been attempted to avoid is the acceleration of the motor over the synchronous speed caused by the oscillation of the load. Another object has been to expand the applications of the brake. A substantial feature of this prior art solution is the use of two brake wheels, whereby the torques achieved with such wheels have been differently adjusted. This has enabled to customize the brake for various purposes and to provide the brake with additional properties, which previously have required specific arrangements.

BRIEF DESCRIPTION OF THE INVENTION

It is an object of the present invention to provide further improvements to the above brake, for instance in such a manner that dynamic strain put upon components carrying the load could be eliminated most effectively without reducing the braking power, and that opening the brake would always be absolutely certain. In addition, the structure should allow combining different functions in a more diversified manner.

These objects are achieved with a brake according to the invention, characterized in that the second disc is axially movingly arranged in relation to the second cam part, and that a third set of friction surface means is arranged between the second cam part and the first disc in order to move the torque from the drive shaft to the driven shaft.

The invention is based on a second brake disc/clutch disc, which moves more freely than previously, and whose course of motion can be adjusted such that the brake can always be opened against the brake torque by means of additional friction surfaces arranged for this purpose, thus ensuring the opening of the brake (the operation of the cam means) always when the brake should be opened.

Since an appropriate amount of flywheel mass is also arranged at the second disc, for instance by means of a separate coupling wheel, on which the second disc and preferably also the third set of friction surface means are arranged, for instance a load torque affecting an input shaft of the hoisting gear forces the driven wheel, when the drive force driving the hoisting gear ends, for instance when the current of an electric motor is switched off, to accelerate at first the flywheel mass and then the actuator, such as a rotor of an electric motor. The appropriate dimensions of the structure allow providing such a torque remaining after the flywheel mass that is unable to open the brake. In a hoisting apparatus this is a very important feature that enables to avoid the load from descending or from abruptly falling, for instance if malfunction or failure occurs in the actuator. In such an unexpected situation, as well as during the end of a normal hoisting procedure, braking is smooth on account of such a structure, and abrupt heavy dynamic loads directed at the braking system are avoided.

The brake according to the invention can also easily be provided with a sliding clutch required in chain hoists, if desired. Thus, the body of the brake comprises two parts, which are axially adjustable in relation to one another, whereby the position or the point of action of the second set of friction surface means can be adjusted and limited by means of a second body part.

The torque of the clutch and the brake is provided using the same spring force of the spring arrangement and the ratio between the two is handled by selecting the ratio of corresponding friction surfaces to be the same as the ratio between the clutch torque and the brake torque. This arrangement provides such an advantage that when the torque of a sliding clutch is being adjusted, the torque of the brake changes at the same time in correct relation to the clutch torque. In the structure of the invention, the clutch torque can be adjusted while the actuator rotates, in the simplest form by rotating the second body part of the brake, thus also providing the clutch with a precisely correct adjustment, since only a dynamic friction coefficient is employed during adjustment.

The spring arrangement preferably comprises a spring array pressing the first disc towards the second cam part, and a second spring array pressing the first cam part towards the second cam part, and that the spring force of the first spring array is considerably greater than the spring force of the second spring array. The second spring array centres the cam parts in relation to one another and the force thereof is selected such that it does not excessively reduce the actual spring force of the first spring array providing the brake torque. The play in the first spring array also compensates for the wear of the friction surfaces.

The advantages of the invention are described in more detail in the following detailed description of the invention.

BRIEF DESCRIPTION OF THE DRAWINGS

The invention will now be explained in greater detail by means of two exemplary implementations with reference to the accompanying drawings, in which FIG. 1 shows a longitudinal view in cross section of a brake according to the invention between a chain hoist and a hand-operated hoist, the brake being in a state in which the load is placed upon the brake;

FIG. 2 shows an enlarged detail of a brake disc/clutch disc arrangement shown in FIG. 1;

FIG. 3 illustrates the brake shown in FIG. 2 in a state in which the load is hoisted;

FIG. 4 illustrates an enlarged detail of a second spring array shown in FIG. 1;

DETAILED DESCRIPTION OF THE INVENTION

Figure 5:
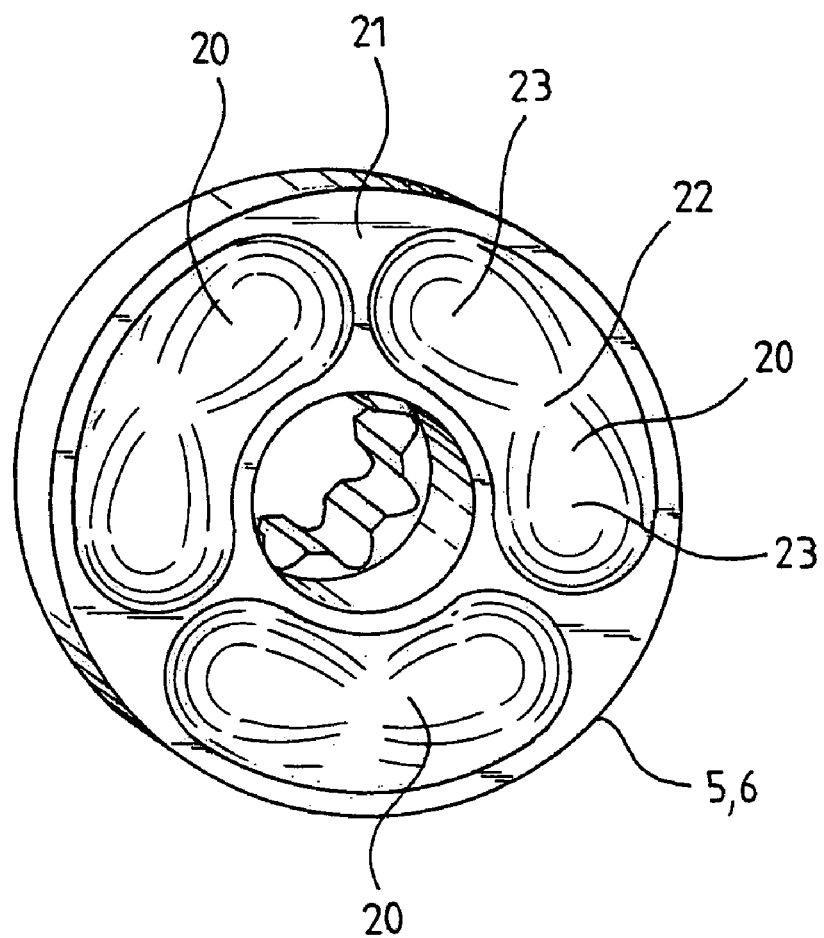
FIG. 5 illustrates an embodiment of the cam parts of the brake shown in the previous Figures.

Referring to FIGS. 1 to 4, a torque controlled brake 1 according to the invention is shown that is arranged between a chain hoist 2 and a hand-operated hoist 3. A rotor 4 of the hand-operated hoist 3 operates as a drive shaft of the system.

The brake 1 comprises firstly cam parts 5 and 6, the first one of which indicated with reference numeral 5 is non-rotatably fastened to the rotor 4, while the second cam part 6 is rotatably and axially movingly arranged on an input shaft 7 of the chain hoist 2, the input shaft functioning as the driven shaft of the system, in other words as the shaft driving the chain hoist 2 and provided with driving force from the rotor 4 of the hand-operated hoist 3. A coupling wheel 8 is non-rotatably and axially non-movingly fastened to the second cam part 6 for providing flywheel mass to the described system.

A brake disc/clutch disc arrangement is arranged between the cam parts 5 and 6, i.e. between the rotor 4 and the input shaft 7 of the chain hoist 2, the arrangement comprising a first disc 9 that is axially movingly but non-rotatably arranged on the input shaft 7, and a second disc 10 that is axially movingly but non-rotatably arranged on the coupling wheel 8 using pins 11 fastened on the periphery of the coupling wheel 8 through which the second disc 10 is thus at the same time fastened to the second cam part 6.

A first set of friction surface means 12 is arranged between the discs 9 and 10, for instance fastened to the first disc 9 (cf. FIG. 2), and a second set of friction surface means 14 is arranged between the second disc 10 and a body 13 of the brake, for instance fastened to the second disc 10. Such friction surface means 12 and 14 are in this example substantially equal in size as regards the effective diameter and the friction surface area, but may also be of varying sizes.

In order to provide a braking engagement between the discs 9 and 10 and the friction surface means 12 and 14 co-operating therewith, a spring arrangement 15, 16 is provided that presses said components 9, 10, 12 and 14 against one another. Such a spring arrangement comprises a first spring array 15, which is arranged between a bearing 17 of the input shaft 7 and the first disc 9 to press the first disc 9 towards the second cam part 6, and a second spring array 16 between a body 13 of the brake and a bearing 18 of the first cam part 5 pressing the first cam part 5 towards the second cam part 6. The spring force of the first spring array 15 is considerably greater than the spring force of the second spring array 16. The spring force of the second spring array 16 should be selected such that it does not excessively reduce the actual spring force provided by the first spring array 15 providing the brake torque. The play of the second spring array 16 forms the wear margin of the friction surface means 12, 14 and 19.

In addition, a third set of friction surface means 19 is by means of the coupling wheel 8 mounted on the second cam part 6, said means being placed non-movably in relation to the coupling wheel 8 and the second cam part 6 and arranged to co-operate with the first disc 9 in order to move the torque from the drive shaft, or the rotor 4, to the driven shaft, or to the input shaft 7 of the chain hoist 2. It should be noted herein that the third set of friction surface means 19 can naturally also be fastened to the first disc 9 without changing the idea or operation thereof in anyway. In addition to the first and second set of friction surface means 12 and 14, the third set of friction surface means 19 may also operate in order to provide a braking engagement. In this example, the effective diameter of the third set of friction surface means is smaller than the corresponding measure of the first and second set of friction surface means 12 and 14. This is not necessarily the case, but the location of the third set of friction surface means 19 sets the limits for the dimensions thereof.

As regards the structure of the cam parts 5 and 6, the cross section of both cam parts 5 and 6 is circular and comprises preferably kidney-shaped grooves 20 in the circumferential direction, the grooves being provided with a deep spot 22 in the middle in respect of a surrounding contact area 21 and low spots 23 at the ends, in which case the opposed cam parts 5 and 6 are connected to one another through the opposed grooves 20 and a ball 24 placed between each opposed pair of grooves.

In brief, when using the hand-operated hoist 3 the cam parts 5 and 6 cause by impact of torque and rotation of the rotor 4 and counter-torque (of the brake torque) of the input shaft 7 to change the axial position between the discs 9 and 10 and the friction surface means 12, 14 and 19 in order to detach at least partly the braking engagement against the power caused by the spring arrangement 15, 16 and at the same time to provide an engagement transferring the torque between the first disc 9 and the coupling wheel 8 using the third set of friction surface means 19 as will be explained in more detail below.

The body 13 of the brake comprises two parts 25, 26 to be axially adjusted in relation to one another, whereby the adjustability is implemented using a thread arrangement 27 between the parts 25 and 26 so that the second set of friction surface means 14 is fastened to the second disc 10, which is pressed against a third disc 28 that is axially movingly but non-rotatably arranged on the first body part 25 by means of pins 29 circularly arranged thereto, and the axial motion of the second disc 10, the second set of friction surface means 14 and the third disc 28 in the direction of the braking power, or towards the body part 26, is restricted and can be adjusted using the second body part 26 (the "cover part" of the brake) supporting the first cam part 5. The axially moving fastening of the third disc 28 can naturally be implemented also to the second body part 26, if it is structurally advantageous. However, the adjustability between the body parts 25, 26 allowing the slidable clutch function is not necessary in all the applications of the invention. The adjustment in question and the effect thereof on the operation of the brake will be described below.

Figure 6:
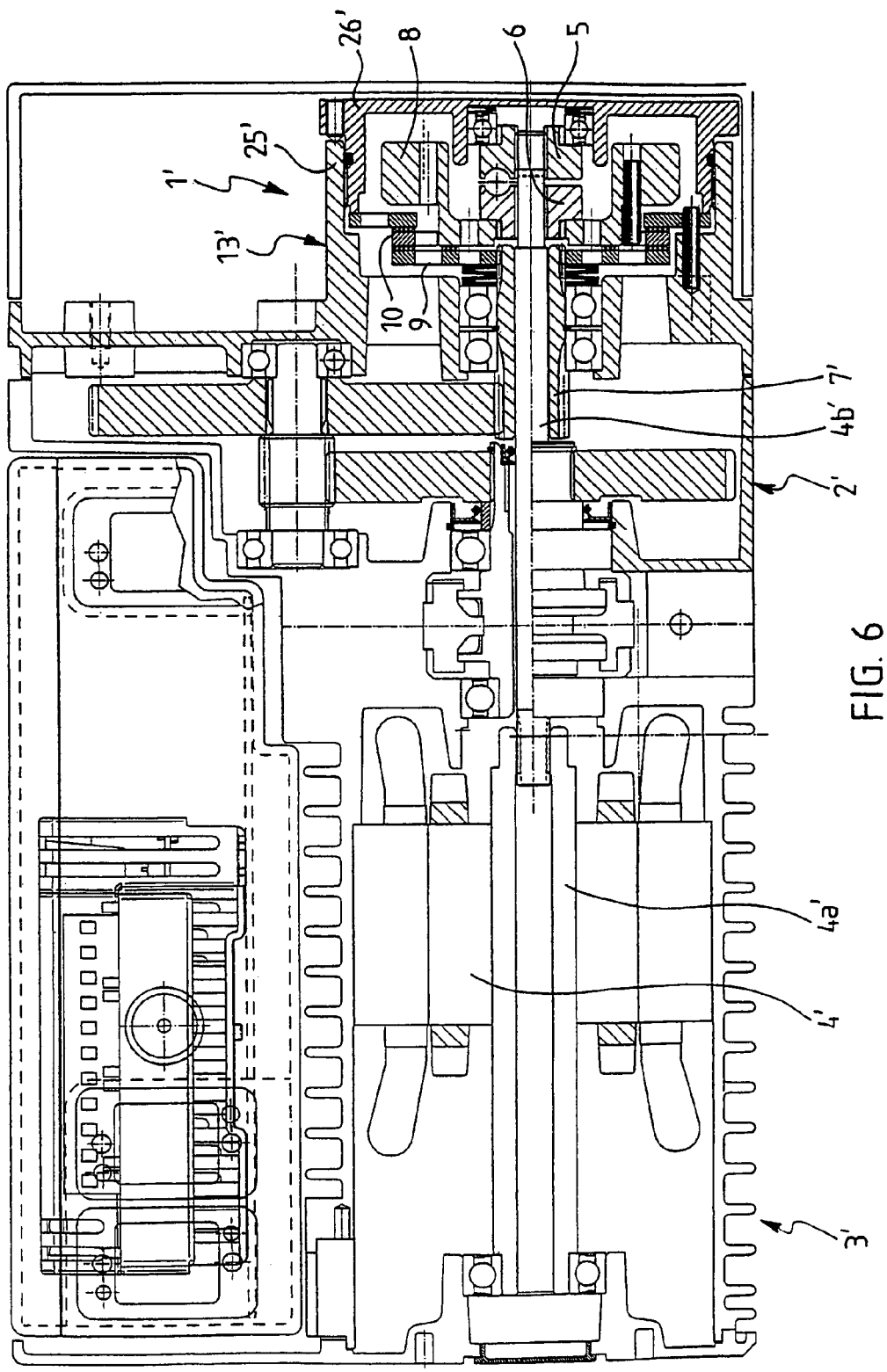
FIG. 6 shows a longitudinal view in cross section of the brake according to the invention in connection with the chain hoist and an electric motor using it, the brake being in a state in which the load is placed upon the brake.

For clarity, FIGS. 1 and 3 show the hoisting apparatus 2 in uncased form, but in practice the apparatus is naturally placed in an appropriate case (cf. for instance the structure in FIG. 6), on which the components thereof can be supported and in which the required lubricant can be placed.

The most essential features of the invention are the axially moving second disc 10 of the brake disc/clutch disc arrangement, the flywheel mass provided by means of the coupling wheel 8 between the input shaft 7 and the cam parts 5, 6 and the torque achieved with the third set of friction surface means 19 in order to move the driving force from the rotor 4 to the input shaft 7. In view of the sliding clutch functions, the axial adjustability of the second set of friction surfaces 14 is essential as well.

The system described above formed of the hand-operated hoist 3, the brake 1 and the chain hoist 2 operates as follows.

FIG. 1 shows a situation, in which a load 30 hanging from the chain hoist 2 rests upon the brake 1. Such a situation occurs for instance when the rotation of the hand-operated hoist 3 is ended (or if it is damaged for some reason), in which case the second spring array 16 presses the first disc 9 and the first set of friction surface means 12 thereof against the second disc 10, which in turn by means of the second set of friction surface means 14 thereof sliding in the pins 11 is pressed towards the third disc 28, the motion of which the second body part 26 restricts and stops. Braking takes place rapidly, but still smoothly, since the second disc 10 together with the coupling wheel 8 ensures that the flywheel masses of the system are also slowed down during braking. If the brake were not used to decelerate the flywheel masses, the load would decelerate on the entire brake torque. In such a case the braking would occur too rapidly and an extremely high dynamic strain would be placed upon the components carrying the load.

In FIG. 3 the brake is in a state in which the load 30 is raised. Then the torque of the rotor 4 is transferred onto the first cam part 5, whereby as the torque brought into the system increases, the first and the second cam part 5 and 6 are rotated in relation to one another and at the same time recede from one another. Since the second spring array 16 provides a smaller spring force than the first spring array 15, the second spring array 16 is at first squeezed together, and thereafter also the first spring array 16 is squeezed together, whereby the coupling wheel 8, which moves axially as much as the second cam part 6, simultaneously pushes the first disc 9 away from the braking engagement with the second disc 10, but remains in the engagement providing torque together with the first disc 9 by means of the third set of friction surface means 19 of the friction surfaces. Consequently the hoisting motion may take place without a dragging brake.

When the torque brought to the system disappears (situation shown in FIG. 1), the torque of the load 30 starts to rotate the system in an opposite direction than during hoisting. Such a situation is the most critical in view of the functionality and safety of the system. This situation is handled in the present invention by appropriately dimensioning the geometry (the pitch, effective diameter and friction coefficient of the grooves 20) of the cam tracks formed by the grooves of the cam parts 5 and 6 and the flywheel masses of the coupling wheel 8 and the rotor 4. Such suitability means that firstly the coupling wheel 8 is placed between the input shaft 7 of the hoisting apparatus 2 and the cam track array 5, 6, 20, 24, as described above, forcing the load torque to accelerate at first the flywheel mass of the coupling wheel 8, whereby the remaining torque may accelerate the rotor 4. The torque accelerating the rotor 4 through the cam track array 5, 6, 20, 24 is made such by selecting the above conditions correctly that the torque arriving from the direction of the load 30 is unable to open the brake as described in the previous chapter.

When the load 30 is lowered, the torque of the rotor 4 allows opening the brake only so much that the load torque barely surpasses the brake torque. Thus, the potential energy of the load is passed as friction work as heat to the friction surface means 12 and 14. This energy can be transferred for instance to the oil placed in the case formed of the body 3 of the brake. The oil may simultaneously be the oil of the hoisting apparatus, as shown in the embodiment described below in FIG. 5. Thus, the load has to be "pushed" downwards when lowering the load 30. Immediately as such a "push" ends, the brake takes hold of the load.

In the structure shown in FIGS. 1 to 4, a sliding clutch, whose structure and advantages achieved therewith have been explained above, required in the chain hoist is connected to the brake. In other words, the torque of the clutch and the brake is provided using the same spring force of the spring array 15, 16 and the ratio between the two is attended to by selecting the ratio of corresponding friction surfaces, i.e. the friction surface means 12, 14 and 19, to be the same as the ratio between the clutch torque and the brake torque. This arrangement provides such an advantage that when the torque of the sliding clutch is being adjusted, the brake torque changes at the same time in correct ratio as regards the clutch torque. In the structure of the invention the clutch torque can be adjusted when rotating the rotor 4 by revolving the second body part 26 and after finding the correct adjustment locking it in position for instance with screws, thus also providing the precisely correct adjustment of the clutch, since only a dynamic friction coefficient is used during adjustment. FIG. 1 shows that the distance between a support surface 31 on the second body part 26 of the second spring array 17 and the coupling wheel 8 remains constant during the adjustment, and therefore only the torque of the first spring array 15 and the clutch and the brake change when the sliding clutch is adjusted.

The structure and operation of a brake 1' associated with an electric motor driven chain hoist 2' are exactly the same as those of the manually operated system, except that a shaft 4a' of the electric motor rotor 4' as well as an extension 4b' thereof form a drive shaft and the second cam part 6, the brake disc/clutch disc arrangement 9, 10, 8, a driven input shaft 7' of a hoisting apparatus 2' and the hoisting apparatus 2' itself are arranged between an electric motor 3' and the first cam part 5 on the drive shaft 4b' in such a manner that the second cam part 6 with the components 8, 9 fastened thereto may rotate therein and move axially and the input shaft 7' of the driven hoisting apparatus 2' may rotate, since the rotor 4' is placed on the opposite side of the system compared with the manually operated system shown in FIGS. 1 to 4 so that the extension 4b' of the shaft 4a' of the rotor 4' has to move through the input shaft 7'. Parts 25' and 26' of a body 13' of the brake are also shaped differently but operate similarly.

In all, the brake according to the invention functions as a load brake in hoisting apparatuses. Compared with a conventional so-called Weston type load brake, the significant difference is that in the brake according to the invention the potential energy of the load is converted into heat only once, whereas in a Weston-type brake much more energy than the potential energy of the load is transferred into heat. Since the potential energy of the load is transferred into heat only once, the brake torque can in this invention be measured to be twice as great as the loading torque, in which case such a brake suffices as the only brake.

In the invention described herein, as explained above, the sliding clutch, the brake and the load braking function have been combined in the sense that when torque of the rotatable mechanism stops, the brake is automatically activated without requiring any additional guidance. The above-described sliding clutch function can be omitted, thus further simplifying the structure.

The opening mechanism of the brake operates in both directions. This is a valuable feature, if the brake is applied for instance to different conveyors.

The above description of the invention is merely intended to illustrate the basic idea of the invention. However, those skilled in the art are able to implement the details of the invention in various ways within the scope of the claims. Thus, for instance the cam parts and the cam tracks may deviate from the above and may be of the kind referred to in the Finnish publication mentioned above. The structure of the different components should only guarantee the operation of the system described above.

The invention claimed is:

1. A torque controlled brake arranged between a drive shaft and a driven shaft, said brake comprising
    a brake disc/clutch disc arrangement arranged between the drive shaft and the driven shaft wherein the drive shaft and the driven shaft are co-axial and said brake/disc clutch arrangement comprising a first disc that is axially movingly but non-rotatably arranged on the driven shaft and a second disc that is axially movingly arranged between the first disc and the drive shaft,
    a first set of friction surface means arranged between the first disc and the second disc,
    a second set of friction surface means arranged between the second disc and a body of the brake,
    a spring arrangement arranged to axially press the discs and the first set and second set of friction surface means co-operating therewith against each other in order to achieve a braking engagement, and
    cam means arranged between the drive shaft and the brake disc/clutch disc arrangement, said cam means comprising a first cam part that is non-rotatably fastened to the drive shaft and a second cam part that is non-rotatably arranged on the second disc, the cam means causing by the impact of torque and rotation of the drive shaft and the possible countertorque of the driven shaft the relative axial position between the discs and the friction surface means to change in order to detach at least partly the braking engagement against a force caused by the spring arrangement,
    wherein
    the second disc is axially movingly arranged in relation to the second cam part,
    a third set of friction surface means is arranged between the second cam part and the first disc in order to move the torque from the drive shaft to the driven shaft, and
    the spring arrangement comprises a first spring array pressing the first disc towards the second cam part and a second spring array pressing the first cam part towards the second cam part, and that the spring force of the first spring array is considerably greater than the spring force of the second spring array, the first spring array and the second spring array being apart and completely separated from each other.

2. A brake as claimed in claim 1, wherein the third set of friction surface means is arranged on the second cam part.

3. A brake as claimed in claim 1, wherein the second disc and the third set of friction surface means are arranged on the second cam part by means of a separate coupling wheel.

4. A brake as claimed in claim 1, wherein the third set of friction surface means is mounted on the first disc.

5. A brake as claimed in claim 1, wherein the body of the brake comprises two parts, which are axially adjustable in relation to one another, whereby the position or point of action of the second set of friction surface means can be adjusted and restricted by the second body part.

6. A brake as claimed in claim 5, wherein threads are arranged between the body parts.

7. A brake as claimed in claim 1, wherein the cross section of both cam parts is circular and comprises circumferentially orientated kidney-shaped grooves, the grooves being provided with a deep spot in the middle and low spots at the ends, and that the cam parts are connected to one another through the opposed grooves and a ball placed between each opposed pair of grooves.

8. A brake as claimed in claim 1, wherein the brake is arranged in an electric motor driven chain hoist, whereby a shaft of a rotor of an electric motor and extension associated therewith form the drive shaft and the second cam part, the brake disc/clutch disc arrangement, the driven shaft of a hoisting apparatus as well as the hoisting apparatus itself are arranged between the electric motor and the first cam part on the drive shaft in such a manner that the second cam part with components fastened thereto may rotate and move axially therein and the driven shaft of the hoisting apparatus may rotate therein.

9. A brake as claimed in claim 1, wherein the brake is arranged in a manually operated chain hoist, in which case the brake is placed between a hand-operated hoist and a hoisting apparatus.

10. A brake as claimed in claim 1, wherein the first spring array pressing the first disc towards the second cam part in a first direction and the second spring array pressing the first cam part towards the second cam part in a second direction opposite to the first direction.

11. A brake as claimed in claim 10, wherein the second cam part is located between the first spring array and the second spring array.

12. A brake as claimed in claim 1, wherein the second cam part is located between the first spring array and the second spring array.

* * * * *